Patented Sept. 18, 1951

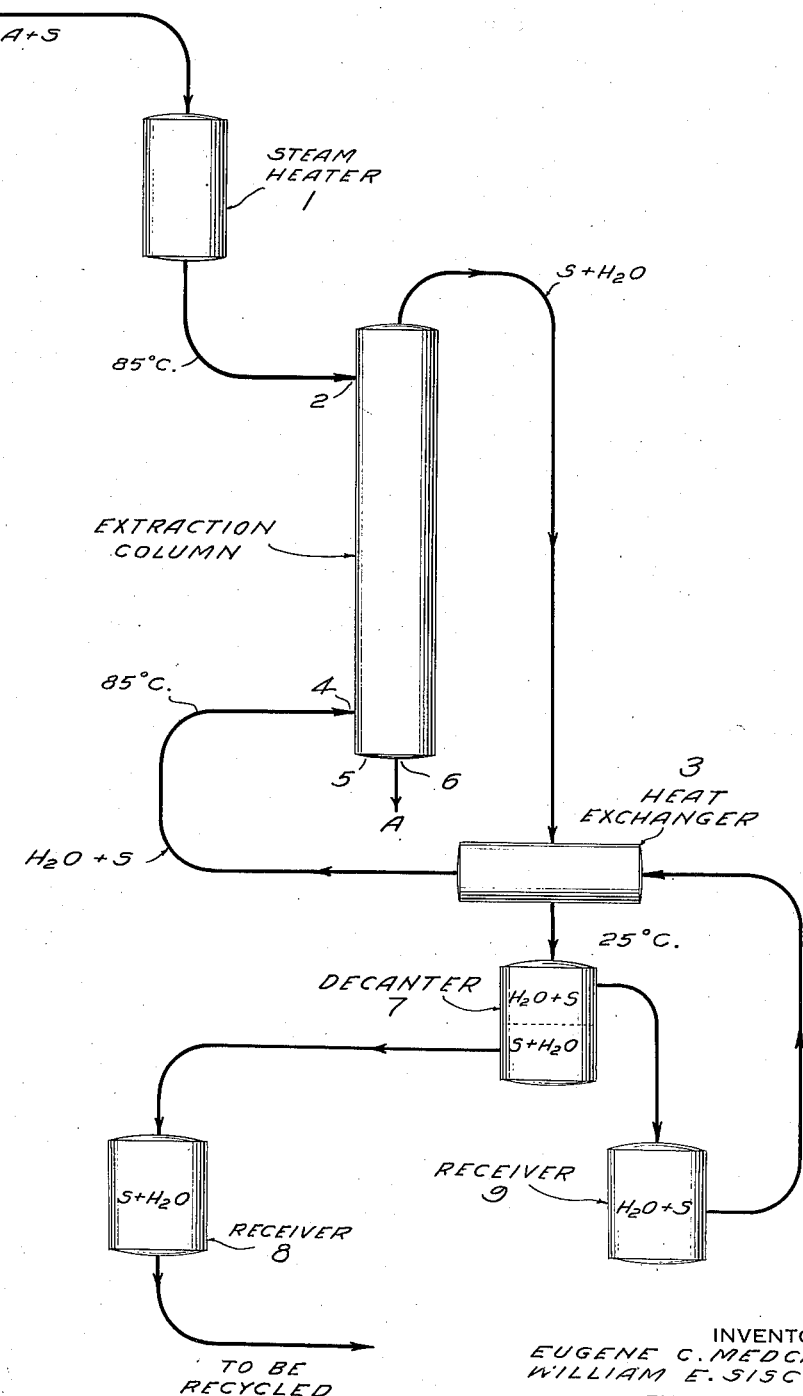

2,568,160

UNITED STATES PATENT OFFICE 2,568,160

RECOVERY OF DICYANODIALKYL AMINES

Eugene C. Medcalf, Bound Brook, and William E. Sisco, Somerville, N. J., assignors to American Cyanamid Company, New York, N. Y., a corporation of Maine Application February 10, 1950, Serial No. 143,586

13 Claims. (Cl. 260—465.5)

This invention relates to an improved method of recovering dinitrile amine solvents of the bis (cyanoalkyl) amine type which are readily soluble in water at elevated temperatures but which are immiscible with water at ordinary temperatures.

Bis-(cyanoalkyl) amines are useful as solvents for the separation of unsaturated compounds from more saturated compounds. For example, they may be used to separate aromatics from paraffins and the like. The relatively more unsaturated compounds are preferentially dissolved, the solvents having little or no solvent power for strongly saturated compounds, such as paraffin hydrocarbons. As a result, solutions are obtained of unsaturated materials such as hydrocarbons, N-alkyl aromatic amines, monoalkyl phenols, and the like. If it is attempted to separate these solutions and to recover the solvents by distillation processes, serious losses result because the cyanoalkylamines decompose at the high temperatures required, and the losses represent a serious economic deterrent to the use of the solvents and seriously restrict their field of utility.

The present invention depends on the discovery that it is possible to recover some of the solvents almost quantitatively by the use of water. The present process is not applicable practically to bis (2-cyanoethyl) amines because the latter show too high solubility in water at room temperature. On the other hand, alpha-cyanoalkylamines and cyanoalkylamines having more than two carbon atoms in the alkyl group, show an extraordinarily steep solubility curve in water. It is thus possible to extract the solvents from their dissolved material by using hot water, and then separate the solution into water and solvent layers on cooling to room temperature. The solubility of water in the solvent at room temperature is low, and normally does not interfere with the action of the solvent on reuse.

The recovery of the solvent is very high, and there is practically no loss by decomposition as the temperature never exceeds 100° C. and, even in the presence of water, the solvents are substantially stable. The cost of the process is very low because the water can be reused and therefore introduces no loss in dissolved solvent, and the heat requirements of the process are low.

The invention will be described in greater detail in conjunction with the following specific examples and with the drawing, which is a diagrammatic flowsheet of a typical embodiment of the invention.

In order to make the drawing more clear, the cyanoalkyl amine solvents will be designated by the letter S, and water-insoluble, unsaturated material, such as aromatic hydrocarbons, by the letter A. The general flowsheet will be described first, followed by specific examples giving proportions.

In the drawing, the solution of the aromatics in the solvent is heated to 85° C. in the steam-heated heater 1. The hot liquid is then introduced into an extraction column near the top at point 2. The whole of the column is maintained at about 85° C. Water containing a very small amount of solvent is introduced into the bottom of the extraction column at point 4, and flows up, becoming gradually saturated with solvent, leaving at point 6, while a very concentrated solution of the aromatics-in-solvent, or solvent-in-aromatics, flows out through the bottom of the column at 5. The solution of solvent in water next passes through the heat-exchanger 3, where is is cooled by heat exchange with water containing a small amount of solvent, the latter being heated up and re-introduced into the extraction column at point 4, as described above. In the heat-exchanger the solution of solvent in water is cooled to slightly above room temperature, about 25° C., and flows into a decanting vessel 7, where two layers form, the upper layer being water containing a small percentage of solvent, and the bottom layer solvent containing a small percentage of water. The two layers are continuously decanted, the water layer passing to a receiver 9 from whence it is recirculated through the heat-exchanger 3. The solvent layer goes to a receiver 8 from which it can be re-used in the original process producing the solution of aromatics.

Example 1

The process shown on the flowsheet is carried out using a solution of 10 to 12% of naphthalene in bis (N-cyanomethyl) N-methylamine. Water containing a small amount of solvent is introduced into the bottom of the extraction column, both the solution and the water being heated to about 90° C. The water is introduced at a rate about 3 to 4 times that of the solvent. A raffinate from the bottom of the column consists largely of naphthalene containing only a little dissolved solvent. On cooling, the naphthalene crystallizes, and the last of the solvent may be removed by a hot water wash, the wash water being reused in the process.

The extract from the column containing water and solvent is cooled and separated, the solvent layer containing about 10% water, and the water layer about 10% solvent. The small amount of naphthalene remaining in the solvent is not lost as the solvent may be reused, and the water saturated with solvent is recycled in the solvent recovery process, thus preventing loss.

*Example 2*

The procedure of Example 1 is followed, using a solution of 10% naphthalene in bis(1-cyano-ethyl)amine. The temperature is maintained in the column at about 85° C., and the water-solvent ratio is 6 to 1.

*Example 3*

The procedure of Example 2 is followed, except that the solution is one of toluene in the solvent instead of naphthalene. The column is preferably operated at a slightly lower temperature, about 80° C.; however, the operation is reversed, toluene coming off the top of the column and the water-solvent mixture coming off the bottom. The operation is substantially the same as that described in Example 2.

*Example 4*

The procedure of Example 2 is followed, the solution being 10% naphthalene in bis(beta-cyanoisopropyl)amine. The water ratio is 4 to 1 instead of 6 to 1. The operation is substantially the same as that described in Example 2.

*Example 5*

The procedure of Example 2 is followed, the mixture being a 10% solution of naphthalene in bis(3-cyanopropyl)amine, and the water-to-solvent ratio being 5 to 1.

*Example 6*

The procedure of Example 5 is followed, except that the solvent is bis(2-cyanopropyl)amine. The results are the same as in Example 2.

In the examples various water-to-solvent ratios have been used. These ratios are not critical. However, the examples are typical of good economical lower limits. More water may, of course, be employed, but it is unnecessary and only increases the circulating load on the equipment. A somewhat smaller amount of water can also be used, but if the amount is cut too small the efficiency of the separation sometimes suffers, resulting in more solvent remaining dissolved in the aromatics. It is therefore desirable to operate with a slight excess of water over the absolute minimum which will dissolve the solvent at the high temperatures used.

The examples describe processes which are effected substantially at atmospheric pressure. For most operations this is preferable because it effects a substantial saving of equipment. On the other hand, it is possible to operate the extraction column in the case of continuous processes, or the mixing vessel in the case of batch processes, under moderate pressure. This can result in somewhat higher temperature of the water and has the advantage in some cases of preventing vapor lock or losses where the dissolved material has a considerable vapor pressure at the temperature used in the extraction. Even with pressure it is normally not necessary to go to temperatures higher than 70 to 100° C. and, in fact, it is usually desirable to maintain as low a temperature as is consistent with good solvent recovery.

We claim:

1. A process of separating dissolved material of low water-solubility from solutions in a dinitrile amine solvent selected from the group consisting of bis(cyano-lower alkyl)amines in which the alkyl radicals have more than two carbon atoms and the cyano groups are on carbon atoms at least once removed from the nitrogen atoms, and bis(alpha-cyano-lower alkyl)amines, which comprises mixing the solution with water at a temperature of about 70 to 100° C., the amount of water being sufficient to dissolve the said dinitrile amine solvent at said temperatures and to convert the said solution into a water-insoluble layer and a unitary water-solvent layer, separating the water-insoluble layer from the unitary water-solvent layer, cooling the unitary water-solvent layer to convert the same into a water layer and a dinitrile amine solvent layer and separating the water layer from the dinitrile amine solvent layer.

2. A process according to claim 1 in which the hot water is contacted with the solvent in the form of a counter-current stream and the separation of the water-insoluble layer from the unitary water-solvent layer is effected continuously.

3. A process according to claim 2 in which the dissolved material belongs to the class of aromatic hydrocarbons.

4. A process according to claim 1 in which the solvent is a bis(alpha-cyano-lower alkyl)amine.

5. A process according to claim 4 in which the solvent is bis(1-cyano-ethyl)amine.

6. A process according to claim 4 in which the solvent is bis(N-cyano-methyl)N-methylamine.

7. A process according to claim 2 in which the solvent is bis(alpha-cyano-lower alkyl)amine.

8. A process according to claim 7 in which the solvent is bis(1-cyano-ethyl)amine.

9. A process according to claim 7 in which the solvent is bis(N-cyano-methyl)N-methylamine.

10. A process according to claim 1 in which the solvent is a bis(beta-cyano-lower alkyl)amine.

11. A process according to claim 10 in which the solvent is bis(2-cyano-propyl)amine.

12. A process according to claim 2 in which the solvent is a bis(beta-cyano-lower alkyl)amine.

13. A process according to claim 12 in which the solvent is bis(2-cyano-propyl)amine.

EUGENE C. MEDCALF.
WILLIAM E. SISCO.

REFERENCES CITED

The following references are of record in the file of this patent:

UNITED STATES PATENTS

| Number | Name | Date |
|---|---|---|
| 2,439,534 | Wilkes | Apr. 13, 1948 |
| 2,441,827 | McKinnis | May 18, 1948 |